(12) United States Patent
Takata et al.

(10) Patent No.: US 6,918,559 B2
(45) Date of Patent: Jul. 19, 2005

(54) METHOD OF SLITTING A BATTERY SEPARATOR-USE RESIN FILM OBJECT AND SUCH A BATTERY SEPARATOR-USE RESIN FILM OBJECT

(75) Inventors: Atsuhiro Takata, Toyonaka (JP); Ryuma Kuroda, Ibaraki (JP); Satoshi Hanada, Ibaraki (JP); Takeshi Yamada, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 329 days.

(21) Appl. No.: 10/091,553

(22) Filed: Mar. 7, 2002

(65) Prior Publication Data

US 2002/0132162 A1 Sep. 19, 2002

(30) Foreign Application Priority Data

Mar. 14, 2001 (JP) ....................................... 2001-072320

(51) Int. Cl.$^7$ .............................................. B65H 59/02
(52) U.S. Cl. ..................... 242/420.5; 242/525
(58) Field of Search ................................ 242/416, 418, 242/420, 420.5, 525, 525.1

(56) References Cited

U.S. PATENT DOCUMENTS

| | | | | |
|---|---|---|---|---|
| 2,736,507 A | * | 2/1956 | Neese et al. | |
| 3,416,051 A | * | 12/1968 | Pinto et al. | |
| 4,431,142 A | * | 2/1984 | Kataoka | |
| 4,682,929 A | * | 7/1987 | Kataoka | |
| 4,729,520 A | * | 3/1988 | Kataoka | |
| 6,260,786 B1 | * | 7/2001 | Ueyama | |
| 6,260,787 B1 | * | 7/2001 | Michel et al. | |

FOREIGN PATENT DOCUMENTS

| | | |
|---|---|---|
| JP | 7-188440 A | 7/1995 |
| JP | 11-106533 A | 4/1999 |

* cited by examiner

*Primary Examiner*—William A. Rivera
(74) *Attorney, Agent, or Firm*—Sughrue Mion, PLLC

(57) ABSTRACT

To provide a slitting method of a battery separator-use resin film object that is less susceptible to occurrences of holes and tearing at the time of a slitting process. A slitting device, which is provided with a feeding roll 51 for feeding a film that is wound up to a role with its rotational velocity being controlled, a razor blade for slitting the film to a predetermined width, a sensor for detecting a tension of the film and winding rolls for winding the film up while controlling its tension, is used for carrying out a slitting process in a manner so as to satisfy the following conditions (1) and (2): (Condition 1) $5\times9.8\times10^4 \leq T/L \leq 5\times9.8\times10^5$ (Condition 2) $1 \leq R/T \leq 5$ where L is a thickness (m) of the film object, R is a rotational velocity (m/min) of the feeding roll and T is a tension (N/m) of the film object after having been subjected to the slitting operation.

6 Claims, 2 Drawing Sheets

METHOD OF SLITTING A BATTERY SEPARATOR-USE RESIN FILM OBJECT AND SUCH A BATTERY SEPARATOR-USE RESIN FILM OBJECT

BACKGROUND OF THE INVENTION

1. Field of the Invention

The present invention relates to a slitting method of a battery separator-use resin film object that is less susceptible to defects such as holes and tearing at the time of slitting, and a battery separator-use resin film object obtained by such a method.

2. Prior Art

Conventionally, a film object made of resin (film, sheet, etc.) has been widely used as a battery separator-use material. An explanation will be briefly given of one example of manufacturing processes of this resin-made film object: the processes include a kneading process, a rolling process, a first slitting process, a drawing process and a second slitting process, and these processes are successively carried out in this order. In the kneading process, pellets of a resin composition are manufactured, and rolled into a predetermined film object through the rolling process. This film object is once slit into two parts in the width direction, and rolled and extended in the width direction. This rolling and extending process allows fine pores in the order of sub-micron to be formed therein so that a porous film object is obtained. Then, this porous film object is slit so as to have a desired width dimension in the second slitting process.

SUMMARY OF THE INVENTION

However, since such a battery separator-use resin film object is a porous material, it is highly susceptible to defects such as holes and tearing during a slitting process.

The present invention has been devised to solve the above-mentioned problems, and its objective is to provide a slitting method of battery separator-use resin film object that is less susceptible to defects such as holes and tearing during a slitting process.

In order to solve the above-mentioned problem, the slitting method for manufacturing a battery separator-use resin film object of the present invention is provided with the steps of: providing a slitting device comprising a feeding roll for feeding a film object from a roll-shaped film object with its rotational velocity being controlled; a slitting blade for slitting the film object so as to have a predetermined width; a sensor for detecting a tension of the film object and a wind-up roll for winding up the film object while controlling the tension of the film object, and slitting the film object by using the slitting device in a manner so as to satisfy the following conditions 1 and 2:

$$5 \times 9.8 \times 10^4 \leq T/L \leq 5 \times 9.8 \times 10^5 \quad \text{(Condition 1)}$$

$$1 \leq R/T \leq 5 \quad \text{(Condition 2)}$$

where L is a thickness (m) of the film object, R is a rotational velocity (m/min) of the feeding roll and T is a tension (N/m) of the film object after having been subjected to the slitting operation.

The slitting device for carrying out a slitting operation is provided with the above-mentioned construction. The film object is wound around a feeding roll in a roll shape so that the film object is successively fed by rotating the feeding roll. The film object thus fed is slit by the slitting blade to a predetermined width. The film object thus slit is successively wound around a winding roll, and in this case, a sensor for detecting a tension of the film object after having been slit is placed so that the winding process is carried out while the tension is being controlled so as to satisfy the conditional expression. In order to control the tension, the above-mentioned slitting device is arranged so as to control the rotational velocity of the feeding roll. The rotational velocity is controlled by using, for example, a motor or a brake mechanism.

Tremendous research efforts have been directed by the inventors, etc. of the present invention toward the development of a method of slitting a battery separator-use resin film object, which is less susceptible to occurrences of holes and tearing when the film object is slit, and as a result, they have found that when the slitting operation is carried out on the film object under the above-mentioned conditional expression, it becomes possible to make the film object less susceptible to occurrences of holes and tearing.

In the present invention, the film object conceptually includes not only those that are originally referred to as films, but also a sheet with a thickness thicker than a film, and is generally referred to as a material the thickness of which is thinner in comparison with its width and length.

Moreover, with respect to a resin forming the film object, examples thereof include a polyolefin resin containing not less than 10 weight % of polyolefin having a molecular chain length of not less than 2850 nm. The resin having such a composition is particularly susceptible to tearing, and with respect to film objects made of a resin having such a composition, the slitting method of the present invention is preferably applied.

In a preferred embodiment of the present invention, a slitting process is carried out so as to satisfy the following condition 3.

$$1 \times 10^8 \geq E/T \geq 4 \times 10^7 \quad \text{(Condition 3)}$$

where E is a modulus of elasticity (N/m$^2$) of the film object and T is a tension (N/m) of the film object after having been subjected to the slitting operation.

It has been found that by carrying out the slitting operation under the above-mentioned condition, the film object becomes less susceptible to occurrences of holes and tearing.

In a preferable embodiment of the present invention, the above-mentioned slitting blade is a razor blade, an angle D (°) made by the razor blade and the film object and a thickness L (m) of the film object has a relationship that satisfies the following condition 4:

$$5 \times 10^5 \leq L/D \leq 1 \times 10^6 \quad \text{(Condition 4)}$$

The angle made by the slitting blade and the film object also forms a factor that relates to the susceptibility to occurrences of holes and tearing; and it has been found that by setting the angle of the razor blade so as to satisfy the above-mentioned condition, the film object becomes less susceptible to occurrences of holes and tearing.

DETAILED DESCRIPTION OF THE PREFERRED EMBODIMENTS

<Construction of Manufacturing Line>

Figure 1:
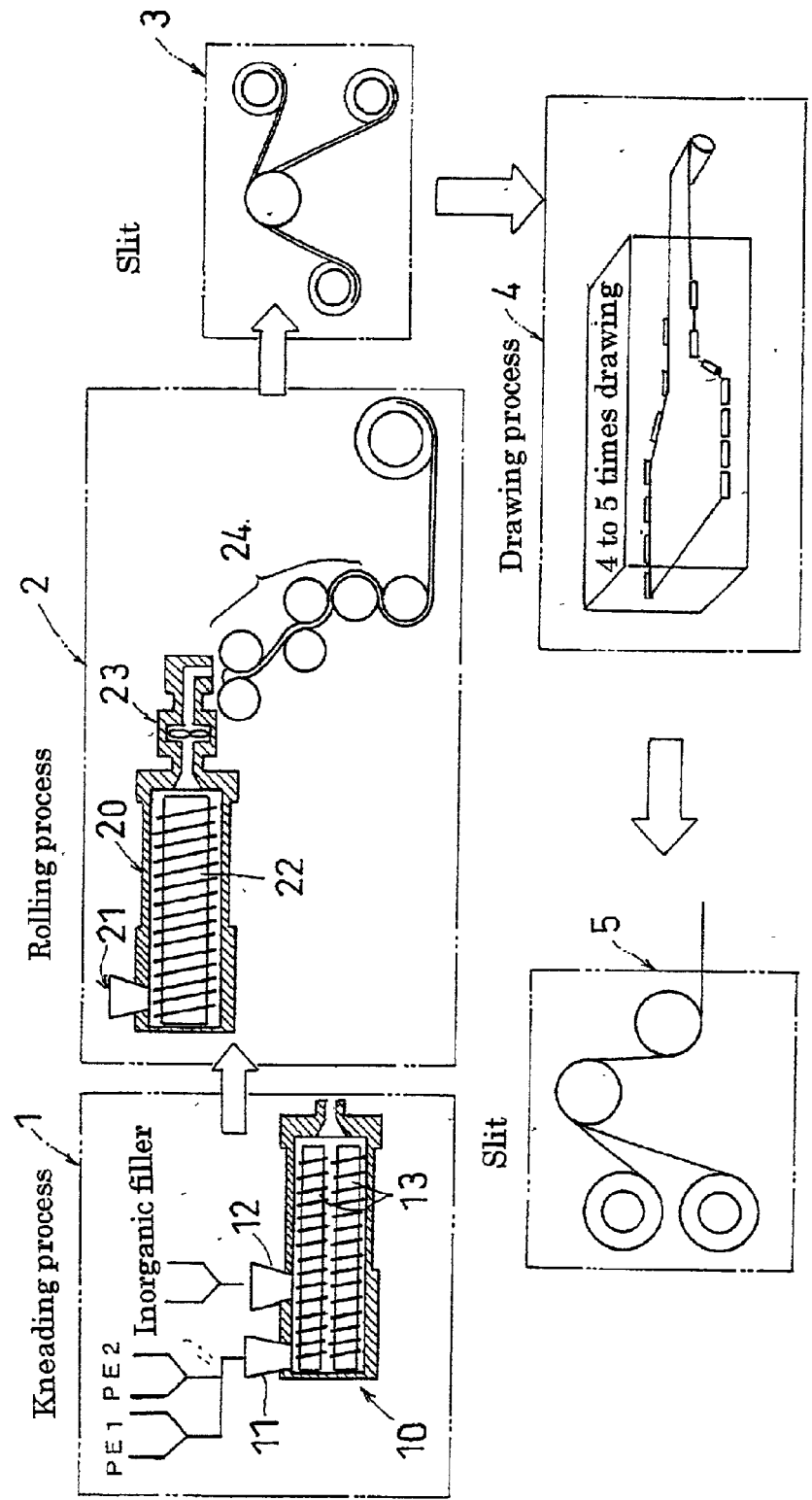
FIG. 1 is a schematic drawing that shows a manufacturing process of a porous film.

FIG. 1 is a schematic drawing that shows a manufacturing line for manufacturing a porous film (battery separator-use resin film). This manufacturing line includes a kneading process 1, a rolling process 2, a first slitting process 3, a drawing process 4 and a second slitting process 5 in the order of processes.

A screw kneading device 10 is used in the kneading process 1, and this kneading device includes a first hopper 11 for supplying a mixed resin and a second hopper 12 for supplying an inorganic filler. The screw kneading device 10 is equipped with twin screws 13, and the mixed resin and the inorganic filler supplied from the respective hoppers 11 and 12 are strongly kneaded, and extruded forward. The resin composition obtained from the kneading process is formed into pellets.

A screw extruder 20 is used in the rolling process 2. This extruder 20 is equipped with a hopper 21 to which the pellets of resin composition obtained in the kneading process 1 is loaded and a screw 22. This extruder 20 extrudes the resin composition so that molten resin in the form of a rod or a sheet is discharged through a die 23; thus, a film rolled by a rolling mechanism 24 is obtained.

In the first slitting process 3, the film, obtained from the rolling process 2, is slit (cut) into two parts in the width direction so that, for example, two films having a width of 300 mm are obtained from a film of 600-mm width.

In the drawing process 4, a film having a width of, for example, 300 mm is drawn 4 to 5 times in the width direction under a predetermined temperature condition. Thus, pores in the order of sub-micron are formed therein so that a porous film is obtained.

A slitting device is used in the second slitting process 5, and the resulting porous film is slit to a desired width dimension.

<Construction of the Slitting Device>

Figure 2:
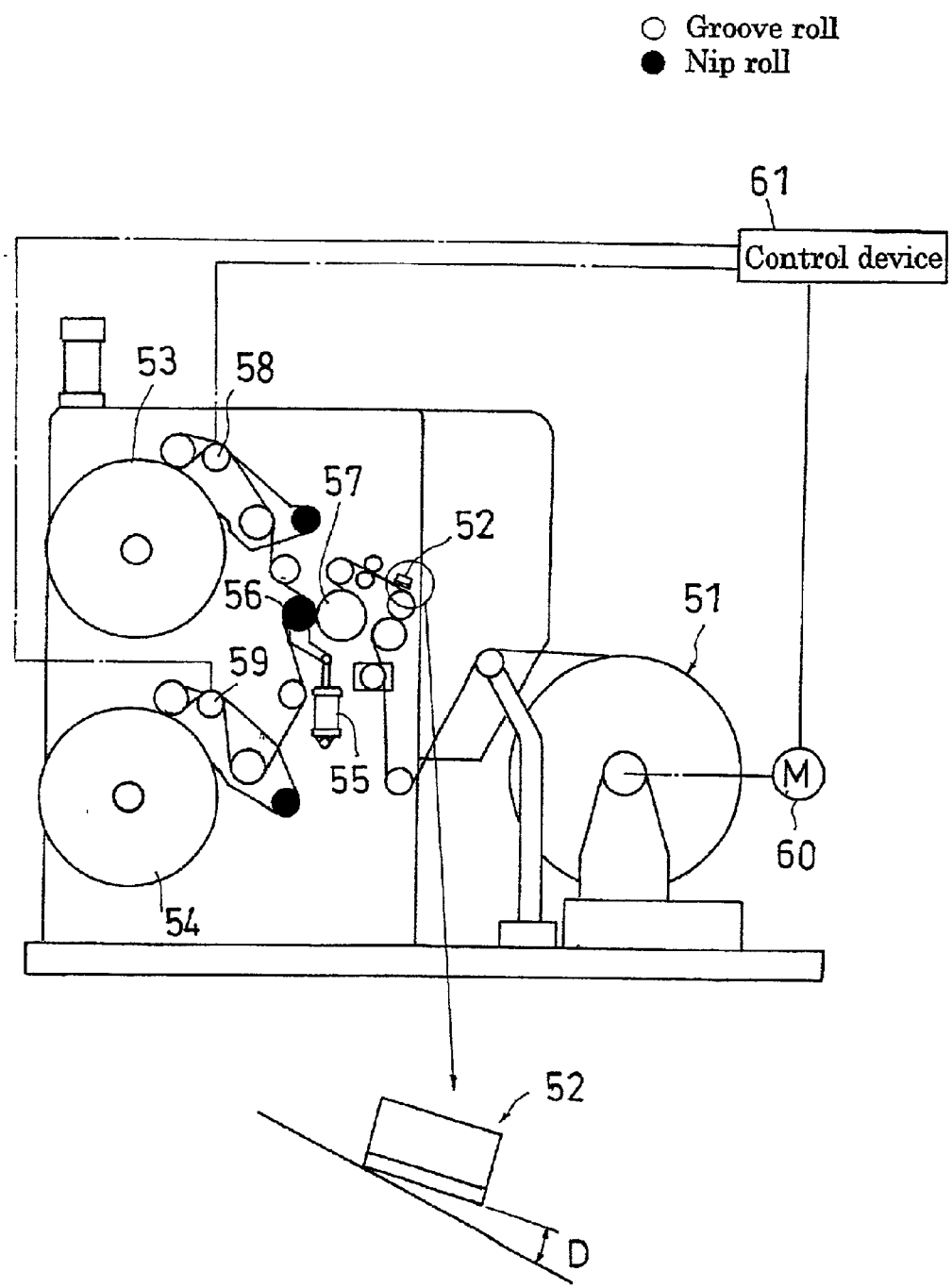
FIG. 2 is a schematic drawing that shows a construction of a slitting device.

FIG. 2 is a schematic drawing that shows the construction of a slitting device. This slitting device is provided with a feeding roll 51 around which the film drawn in the drawing process 4 has been wound so as to form a roll, a razor blade (corresponding to a slitting blade) 52 for slitting the film fed from the feeding roll 51 into a predetermined width, a first winding roll 53 for winding the slit film up, and a second winding roll 54.

With respect to the slitting blade, besides the razor blade, a round tooth may be used. With respect to the slitting system, any of a razor cutting system, a shear cutting system and a score cutting system may be used; however, the razor cutting system is most preferably used because of its cheapness and easiness in handling.

The feeding process of the film from the feeding roll 51 to the winding rolls 53 and 54 is carried out by small-diameter rolls. In FIG. 2, those indicated by ○ are groove rolls, and are provided with grooves through which the film width is guided. Those indicated by ● are nip rolls which transport the film in its sandwiched state in cooperation with dovetail groove rolls. A cylinder 55 is used for driving nip rolls 56, and allows them to contact and separate from a transporting roll 57 having a large diameter.

The feeding roll 51 is driven to rotate by a driving motor 60, and the driving motor 60 is controlled by a control device 61. Sensors for detecting a tension of a film that has been slit are attached to the axes of guide rolls 58 and 59 so that outputs of the sensors are inputted to the control device 61.

The control device 61 controls the driving motor 60 so as to set the tension to an appropriate value, thereby controlling the rotational velocity of the feeding roll 51. The control of the rotational velocity of the roll 51 can be carried out by controlling the rotational velocity of the driving motor 60, and a braking mechanism may be operated; however, this arrangement is not intended to be limited by a specific method.

The film to be slit by this slitting device is a porous film, and easily susceptible to occurrences of holes and tearing during the slitting process. Therefore, in order to make the film less susceptible to occurrences of holes and tearing, the slitting process is carried out in a manner so as to allow the relationship among the rotational velocity of the feeding roll 51, the tension of the film and the film thickness to satisfy the following conditions.

$$5 \times 9.8 \times 10^4 \leq T/L \leq 5 \times 9.8 \times 10^5 \quad \text{(Condition 1)}$$

$$1 \leq R/T \leq 5 \quad \text{(Condition 2)}$$

where L is a thickness (m) of the film object, R is a rotational velocity (m/min) of the feeding roll and T is a tension (N/m) of the film object after having been subjected to the slitting operation.

By satisfying these conditions, the film object becomes less susceptible to occurrences of holes and tearing.

Moreover, with respect to another condition, the slitting process is preferably carried out so as to satisfy the following condition 3.

$$1 \times 10^8 \geq E/T \geq 4 \times 10^7 \quad \text{(Condition 3)}$$

where E is a modulus of elasticity (N/m²) of the film object and T is a tension (N/m) of the film object after having been subjected to the slitting operation.

Moreover, the angle D(°)(see FIG. 2) made by the razor blade 52 and the film, and the film thickness L (m) are preferably set to have a relationship that satisfies the following condition 4.

$$5 \times 10^5 \leq L/D \leq 1 \times 10^6 \quad \text{(Condition 4)}$$

By satisfying these conditions, the film object becomes further less susceptible to occurrences of holes and tearing.

<Concerning Battery Separator-use Resin>

An explanation will be given of a battery separator-use resin that is dealt in the slitting device in the present invention.

This resin is kneaded by using a screw kneading device 10, and is obtained by kneading a mixed resin of 100 parts by weight and an inorganic filler of 10 to 300 parts by weight.

With respect to the mixed resin, a mixture, which is made by blending ultrahigh molecular polyolefin [A] having a weight-average molecular chain length of not less than 2850 nm and polyolefin wax [B] having a weight-average molecular weight of 700 to 6000 at a ratio of [A]/[B]=50/50 to 90/10 weight %, is used.

Examples of the olefin constituting the polyolefin resin include: ethylene, propylene, butene and hexene. Specific examples of polyolefin include: polyethylene-based resins such as low-density polyethylene, linear polyethylene (ethylene-α-olefin co-polymer) and high-density polyethylene, polypropylene-based resins such as polypropylene and ethylene-propylene copolymers, poly(4-methylpentene-1), poly(butene-1) and ethylene-vinylacetate copolymer, etc.

In accordance with the slitting method of the present invention, it is possible to slit a film object made of a resin composition containing a polyolefin component having a molecular chain length of not less than 2850 nm at not less than 10 weight % with respect to the entire composition, without causing defects such as holes and tearing at the time of a slitting process.

Polyolefin having a molecular chain length of not less than 2850 nm (referred to as long-molecular-chain polyolefin in the present invention) is particularly superior in strength, and when a film contains such long-molecular-chain polyolefin at not less than 10 weight % with respect to the entire resin composition, the strength of the film is greatly improved; therefore, the film is utilized in various applications, and when it is contained at not less than 20 weight %, and in particular, not less than 30 weight %, a film having higher strength can be obtained. The molecular chain length, the weight-average molecular chain length, the molecular weight and the weight-average molecular weight of polyolefin are measured by GPC (gel permeation chromatography), and the content (weight %) of polyolefin within the specific molecular-chain length range or the specific molecular-weight range can be obtained by the process of integration of the molecular weight distribution curve obtained by the GPC measurements.

In the conventional processing method in which an inorganic filler of 10 to 300 parts by weight is added to the mixed resin of 100 parts by weight, problems are raised in which melt fractures or lateral screen-shaped holes appear in film forming process, resulting in a failure to obtain a film having a good film-thickness precision; however, in accordance with the method of the present invention, it is possible to obtain a film having a superior film-thickness precision, and also to improve the rigidity of the resulting film. The amount of addition of an inorganic filler of less than 10 parts by weight fails to sufficiently improve the rigidity of the resulting film, while the amount of addition exceeding 300 parts by weight only provides a low improving effect on the rigidity in comparison with the amount of addition.

With respect to the inorganic filler, examples thereof include: calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass powder and zinc oxide.

<Another Embodiment>

With respect to a specific construction of the slitting device, it is not intended to be limited by the one shown in FIG. 2, various modifications may be made within the scope of the present invention. For example, in the present invention, the film is slit by a razor blade into two parts; however, this may be slit into three or more parts.

What is claimed is:

1. A slitting method for manufacturing a battery separator-use resin film object comprising the steps of: providing a slitting device comprising a feeding roll for feeding a film object from a scrolled film object with its rotational velocity being controlled; a slitting blade for slitting said film object so as to have a predetermined width; a sensor for detecting a tension of said film object and a wind-up roll for winding up said film object while controlling the tension of said film object, and slitting said film object by using said slitting device in a manner so as to satisfy the following conditions 1 and 2:

$$5 \times 9.8 \times 10^4 \leq T/L \leq 5 \times 9.8 \times 10^5 \quad \text{(Condition 1)}$$

$$1 \leq R/T \leq 5 \quad \text{(Condition 2)}$$

where L is a thickness (m) of said film object, R is a rotational velocity (m/min) of said feeding roll and T is a tension (N/m) of said film object after having been subjected to the slitting operation.

2. The slitting method of a battery separator-use resin film object according to claim 1, wherein said slitting operation is carried out in a manner so as to satisfy the following condition 3:

$$1 \times 10^8 \geq E/T \geq 4 \times 10^7 \quad \text{(Condition 3)}$$

where E is a modulus of elasticity (N/m$^2$) of said film object and T is a tension (N/m) of said film object after having been subjected to the slitting operation.

3. The slitting method of a battery separator-use resin film object according to claim 1 or 2, wherein: said slitting blade is a razor blade and an angle D (°) made by said razor blade and said film object and a thickness L (m) of said film object has a relationship that satisfy the following condition 4:

$$5 \times 10^5 \leq L/D \leq 1 \times 10^6 \quad \text{(Condition 4)}$$

4. A battery separator-use resin film object obtained by using the slitting method according to claim 1.

5. A battery separator-use resin film object obtained by using the slitting method according to claim 2.

6. A battery separator-use resin film object obtained by using the slitting method according to claim 3.

* * * * *